United States Patent
Chen et al.

(10) Patent No.: US 12,442,695 B2
(45) Date of Patent: Oct. 14, 2025

(54) TEMPERATURE SENSING DEVICE

(71) Applicant: LEAP Semiconductor Corp., Taoyuan (TW)

(72) Inventors: Wei-Fan Chen, Taichung (TW); Kuo-Chi Tsai, Taoyuan (TW)

(73) Assignee: LEAP Semiconductor Corp., Taoyuan (TW)

( * ) Notice: Subject to any disclaimer, the term of this patent is extended or adjusted under 35 U.S.C. 154(b) by 476 days.

(21) Appl. No.: 17/979,743

(22) Filed: Nov. 2, 2022

(65) Prior Publication Data

US 2024/0102869 A1 Mar. 28, 2024

(30) Foreign Application Priority Data

Sep. 26, 2022 (TW) .................................. 111136365

(51) Int. Cl.
*G01K 7/18* (2006.01)
*H01C 10/16* (2006.01)
*H01C 13/02* (2006.01)

(52) U.S. Cl.
CPC ............... *G01K 7/18* (2013.01); *H01C 10/16* (2013.01); *H01C 13/02* (2013.01)

(58) Field of Classification Search
CPC ........... H01C 10/16; H01C 13/02; G01K 7/18
See application file for complete search history.

(56) References Cited

U.S. PATENT DOCUMENTS

| | | | | |
|---|---|---|---|---|
| 4,175,418 A | * | 11/1979 | Steffen | G01K 3/005 374/112 |
| 4,340,886 A | * | 7/1982 | Boldt | G01K 3/005 374/E1.019 |
| 6,046,470 A | | 4/2000 | Williams et al. | |
| 7,368,784 B2 | | 5/2008 | Botti et al. | |
| (Continued) | | | | |

FOREIGN PATENT DOCUMENTS

| | | |
|---|---|---|
| CN | 1773231 | 5/2006 |
| CN | 111506147 | 6/2022 |
| TW | I288414 | 10/2007 |

OTHER PUBLICATIONS

"Office Action of Taiwan Counterpart Application", issued on Jul. 21, 2023, p. 1-p. 9.

(Continued)

*Primary Examiner* — Menatoallah Youssef
*Assistant Examiner* — Khareem E Almo
(74) *Attorney, Agent, or Firm* — JCIPRNET (57) ABSTRACT

A temperature sensing device includes a resistor string and a control circuitry. The resistor string includes a variable resistor, a first resistor, and a second resistor which are coupled in series with each other. The resistor string is coupled between a sensing end and a reference ground voltage. The first resistor and the second resistor are coupled to a monitoring end to provide a monitoring voltage. The control circuitry compares the monitoring voltage with a plurality of reference voltages to generate sensing temperature information, and generate adjustment information (Continued)

according to the sensing temperature information. The control circuitry adjusts a resistance provided by the variable resistor according to the adjustment information. The first resistor is a polysilicon resistor, and the second resistor is a silicon carbide diffusion resistor.

19 Claims, 8 Drawing Sheets

(56) References Cited

U.S. PATENT DOCUMENTS

| | | | |
|---|---|---|---|
| 10,819,102 B2 | 10/2020 | Mayell | |
| 10,833,668 B2 | 11/2020 | Lai et al. | |
| 10,955,297 B2 * | 3/2021 | Wang | H10D 30/66 |
| 2013/0153900 A1 | 6/2013 | Kinouchi et al. | |
| 2022/0271156 A1 * | 8/2022 | Peters | H10D 84/144 |

OTHER PUBLICATIONS

Giovanni Pangallo et al., "Use of Body-Diode for Thermal Monitoring of Power MOSFET", Sensordevices 2018 : The Ninth International Conference on Sensor Device Technologies and Applications, Sep. 16, 2018, pp. 132-135.

Y. Wang et al., "Achieving Low Sheet Resistance from Implanted P-type Layers in 4H—SiC using High Temperature Graphite Capped Annealing", Materials Science Forum vols. 556-557, Sep. 15, 2007, pp. 1-5.

D. M. Nguyen et al., "Comparison of Electrical Properties of Ohmic Contact Realized on p-type 4H—SiC", Materials Science Forum vols. 600-603, Sep. 26, 2008, pp. 1-5.

Maxime Berthou et al., "Monolithically Integrated Temperature Sensor in Silicon Carbide Power MOSFETs", IEEE Transactions on Power Electronics, vol. 29, No. 9, Nov. 7, 2013, pp. 4970-4977.

M. A. Capano et al., "Ionization energies and electron mobilities in phosphorus- and nitrogen-implanted 4H-silicon carbide", Journal of Applied Physics, vol. 87, No. 12, Jun. 15, 2000, pp. 1-6.

Manjula S. Raman et al., "Physical Model for the Resistivity and Temperature Coefficient of Resistivity in Heavily Doped Polysilicon", IEEE Transactions on Electron Devices, vol. 53, No. 8, Jul. 24, 2006, pp. 1885-1892.

Xiao-Yu Tang et al., "Characteristics and Breakdown Behaviors of Polysilicon Resistors for High Voltage Applications", Advances in Condensed Matter Physics, vol. 2015, Article ID 423074, Apr. 27, 2015, pp. 1-5.

* cited by examiner

TEMPERATURE SENSING DEVICE

CROSS-REFERENCE TO RELATED APPLICATION

This application claims the priority benefit of Taiwan application serial no. 111136365, filed on Sep. 26, 2022. The entirety of the above-mentioned patent application is hereby incorporated by reference herein and made a part of this specification.

BACKGROUND

Technical Field

The disclosure relates to a temperature sensing device, and more particularly, to a temperature sensing device configured to sense a junction temperature of a power transistor.

Related Art

Power transistors often operate in high-temperature environments and are thus particularly sensitive to the upper operating temperature limit. When a power transistor operates in an environment above the upper temperature limit, the power transistor is particularly prone to damage as it undergoes a transient phenomenon.

Therefore, it is necessary to detect the ambient temperature for the operation of the power transistor. The key is whether the response speed of a temperature detection circuit in temperature detection is high enough to protect the power transistor from damage. However, if the temperature detection circuit is designed to be too sensitive, the temperature detection operation may malfunction and erroneously turn off the operation of the power transistor Accordingly, how to design a temperature detection circuit that can correctly determine and quickly respond to the overtemperature phenomenon is an issue for those skilled in the art to work on.

SUMMARY

The disclosure provides a temperature sensing device that can improve the accuracy of temperature sensing results.

A temperature sensing device according to an embodiment of the disclosure includes a resistor string and a control circuitry. The resistor string includes a variable resistor, a first resistor, and a second resistor which are coupled in series with each other. The resistor string is coupled between a sensing end and a reference ground voltage. The first resistor and the second resistor are coupled to a monitoring end to provide a monitoring voltage. The control circuitry is coupled to the resistor string, receives the monitoring voltage, generates sensing temperature information by comparing the monitoring voltage with a plurality of reference voltages, and generates adjustment information according to the sensing temperature information. The control circuitry adjusts a resistance provided by the variable resistor according to the adjustment information, the first resistor is a polysilicon resistor, and the second resistor is a silicon carbide diffusion resistor.

Based on the above, the control circuitry of the temperature sensing device of the disclosure may obtain the sensing temperature information according to the monitoring voltage generated by the resistor string, and generate the adjustment information by comparing the sensing temperature information with actual temperature information. The temperature sensing device adjusts the resistance of the variable resistor based on the adjustment information to correct the sensing temperature information and improve the accuracy of the temperature sensing result.

To make the aforementioned more comprehensible, several embodiments accompanied with drawings are described in detail as follows.

DESCRIPTION OF THE EMBODIMENTS

Figure 1:
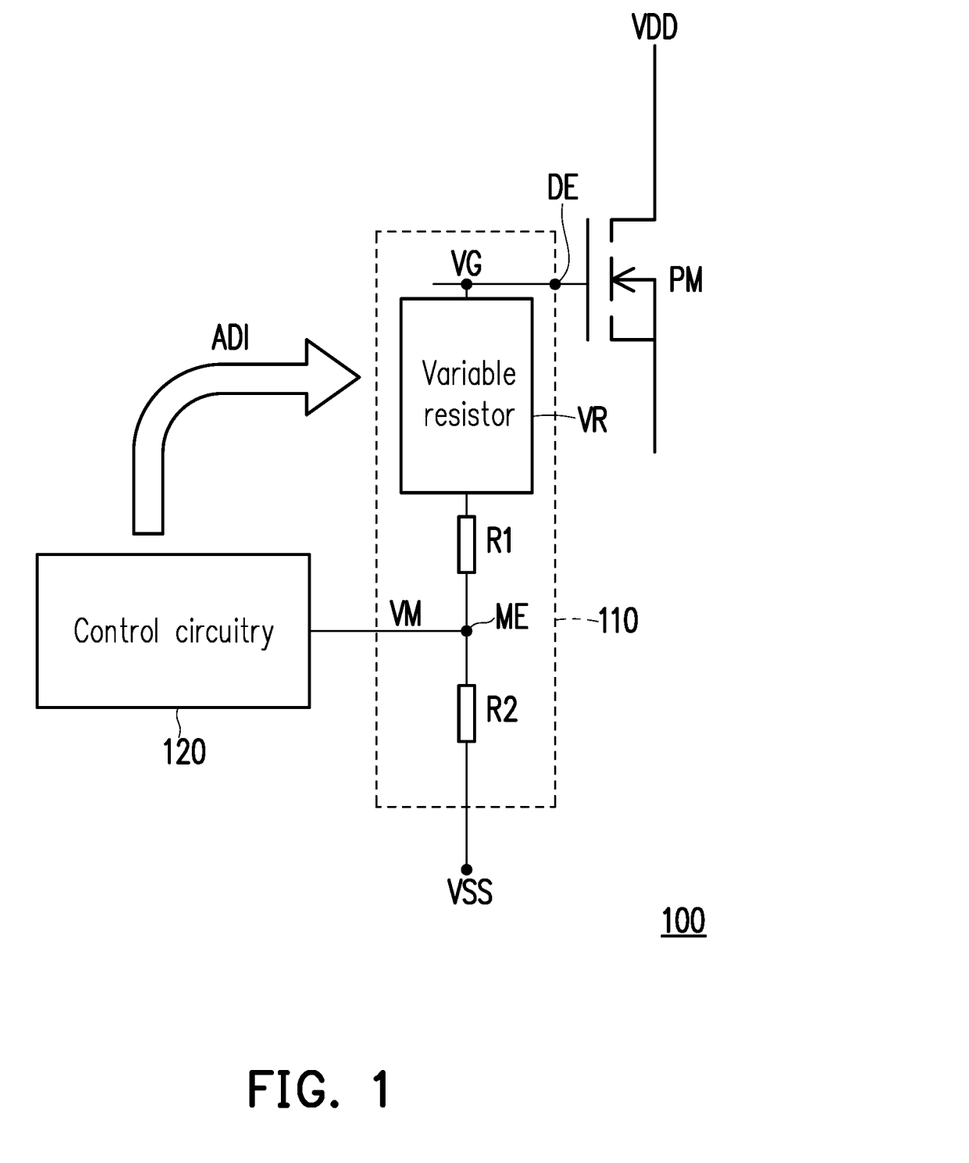
FIG. 1 is a schematic view showing a temperature sensing device according to an embodiment of the disclosure.

Referring to FIG. 1, FIG. 1 is a schematic view showing a temperature sensing device according to an embodiment of the disclosure. A temperature sensing device 100 includes a resistor string 110 and a control circuitry 120. The resistor string 110 includes a variable resistor VR, a first resistor R1, and a second resistor R2 which are coupled in series with each other. The resistor string 110 is coupled between a sensing end DE and a reference ground voltage VSS. The first resistor R1 and the second resistor R2 are coupled to a monitoring end ME. The first resistor R1 and the variable resistor VR are coupled in series with each other between the sensing end DE and the monitoring end ME, and the second resistor R2 is coupled between the monitoring end ME and the reference ground voltage VSS. In this embodiment, the sensing end DE may be a control terminal of a power transistor PM.

The resistor string 110 is configured to divide a voltage difference between a sensing voltage VG on the sensing end DE and the reference ground voltage VSS to generate a monitoring voltage VM on the monitoring end ME. In this embodiment, the first resistor R1 is a polysilicon resistor, and the second resistor R2 may be a silicon carbide (SiC) diffusion resistor. It is known to those skilled in the art that the resistance of a polysilicon resistor has relatively low sensitivity to temperature changes, while a silicon carbide diffusion resistor has relatively high sensitivity to temperature changes. That is, when a temperature sensing operation is performed, the monitoring voltage VM on the monitoring end ME may be correspondingly generated according to changes in the second resistor R2 due to temperature changes.

The variable resistor VR of the disclosure is mainly formed of a polysilicon resistor, and the resistance provided by the variable resistor VR has relatively low temperature sensitivity.

On the other hand, the control circuitry 120 is coupled to the monitoring end ME and receives the monitoring voltage VM. The control circuitry 120 may learn about a junction temperature on the sensing end DE according to the monitoring voltage VM. Specifically, the control circuitry 120 may be preset with a plurality of reference voltages respectively corresponding to a plurality of temperature values. The control circuitry 120 compares the monitoring voltage VM with the plurality of preset reference voltages and generates sensing temperature information by determining between which two reference voltages the monitoring voltage VM falls.

Regarding the setting operation of the reference voltages, specifically, taking a reference voltage VR1 corresponding to a temperature T1 as an example, at the temperature T1, the voltage dividing ratio formed in the resistor string 110 can divide the sensing voltage VG to generate a monitoring voltage VM right equal to the reference voltage VR1. If a reference voltage VRM corresponds to a temperature TM, it means that at the temperature TM, the voltage dividing ratio formed in the resistor string 110 can divide the sensing voltage VG to generate a monitoring voltage VM right equal to the reference voltage VRM.

On the other hand, the control circuitry 120 may further generate adjustment information ADI according to the generated sensing temperature information. In a calibration mode, in a normal temperature (e.g., equal to 25 degrees Celsius) environment, the control circuitry 120 may determine whether the sensing temperature information indicates that the sensing temperature is degrees Celsius. When the control circuitry 120 determines that the sensing temperature indicated by the sensing temperature information is not 25 degrees Celsius, the resistance of the variable resistor VR may be adjusted according to the generated adjustment information ADI. By adjusting the resistance of the variable resistor VR, the monitoring voltage VM and the corresponding sensing temperature information are adjusted, so that the sensing temperature indicated by the adjusted sensing temperature information is 25 degrees Celsius. Of course, if the sensing temperature indicated by the sensing temperature information is 25 degrees Celsius, the control circuitry 120 does not need to perform adjustment operation of the resistance of the variable resistor VR.

The normal temperature environment described above may be created with the power transistor PM not working. When the power transistor PM is turned off, the junction temperature on its control terminal (sensing end DE) may be approximately equal to the ambient temperature.

In this embodiment, a first terminal of the power transistor PM may receive an operating power VDD, and a second terminal of the power transistor PM may be coupled to a load circuit.

It is learned from the description above that the temperature sensing device 100 according to this embodiment of the disclosure may adjust the resistance of the variable resistor VR according to the monitoring voltage VM and the corresponding sensing temperature information in the calibration mode. Accordingly, in the temperature sensing device 100, errors in the sensing temperature caused due to various factors can be effectively compensated, and the accuracy of the temperature sensing device 100 can be improved.

In other embodiments of the disclosure, the positions of the first resistor R1 and the variable resistor VR may be exchanged. That is, in other embodiments of the disclosure, the first resistor R1 may also be coupled between the sensing end DE and the variable resistor VR.

In this embodiment, the control circuitry 120 may be a processor having computing capacities. Alternatively, the control circuitry 120 may be a hardware circuitry that is designed according to hardware description languages (HDL) or any other digital circuit design methods familiar to those skilled in the art, implemented in the form of a field programmable gate array (FPGA), a complex programmable logic device (CPLD), or an application-specific integrated circuit (ASIC). In some embodiments of the disclosure, the control circuitry 120 may be provided on a testing device.

Figure 2A:
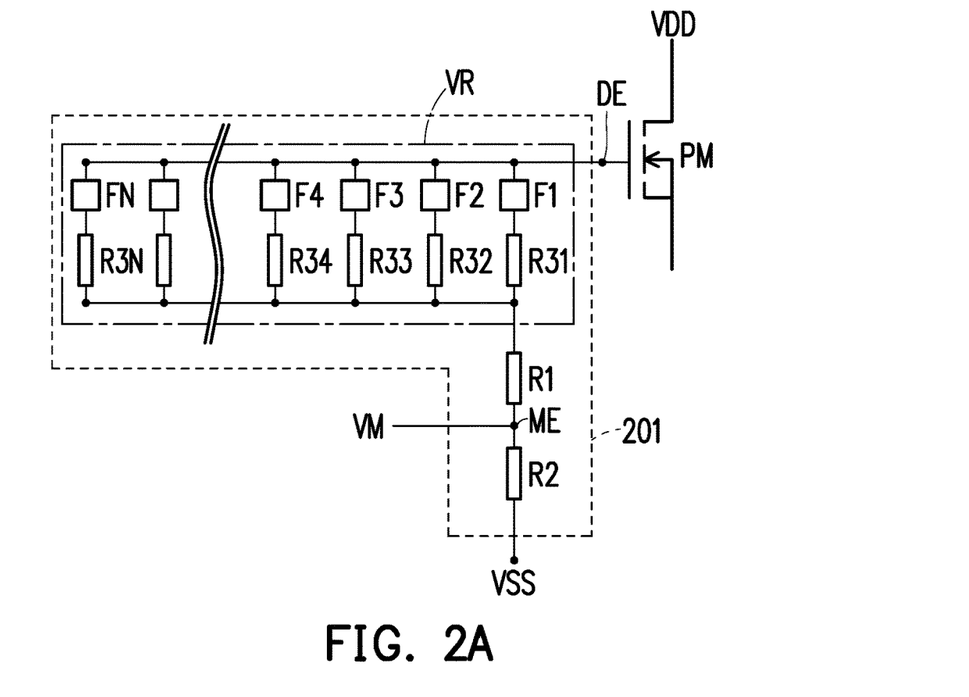
FIG. 2A to FIG. 2C are schematic views showing multiple examples of a resistor string in a temperature sensing device according to embodiments of the disclosure.
Figure 2B:
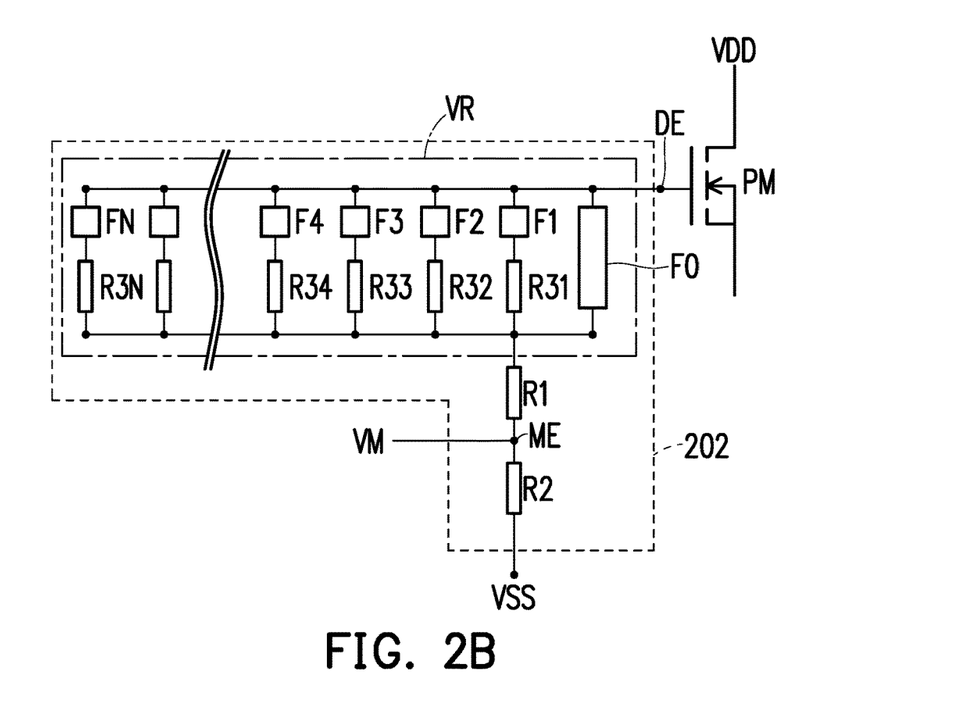
Figure 2C:
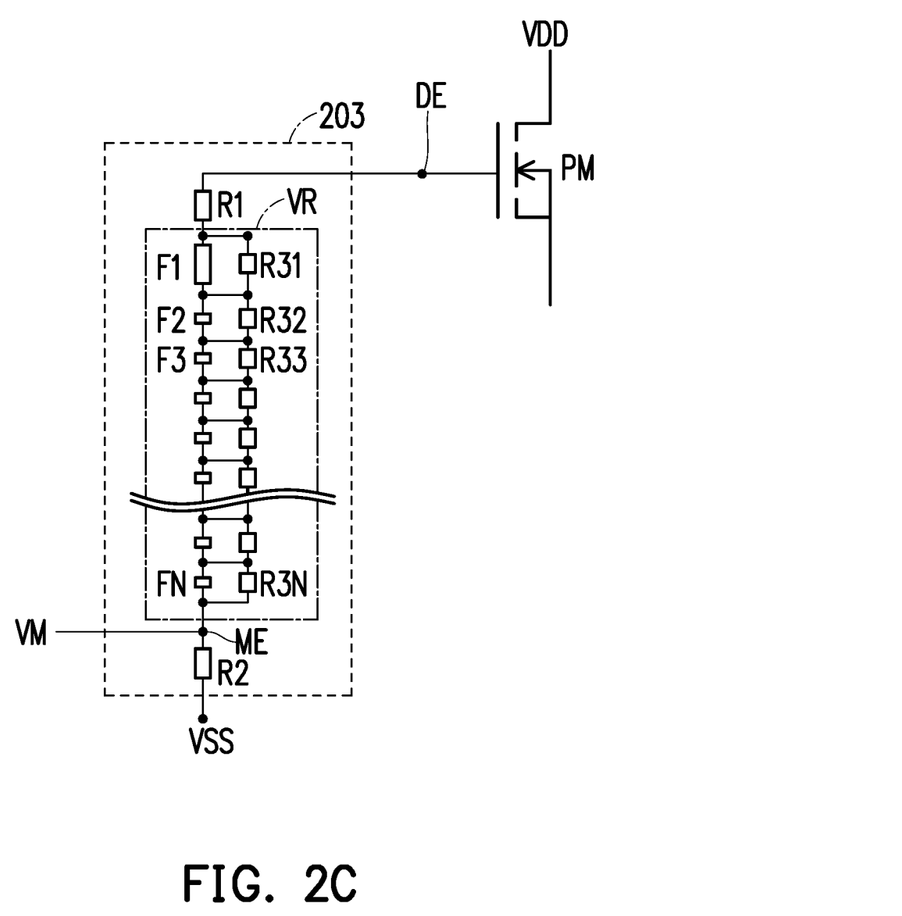

Regarding the implementation details of the resistor string 110, referring to FIG. 2A to FIG. 2C, FIG. 2A to FIG. 2C are schematic views showing multiple examples of a resistor string in a temperature sensing device according to embodiments of the disclosure. In FIG. 2A, a resistor string 201 includes a variable resistor VR, a first resistor R1, and a second resistor R2. The variable resistor VR and the first resistor R1 are sequentially coupled in series with each other between a sensing end DE and a monitoring end ME, and the second resistor R2 is coupled between the monitoring end ME and a reference ground voltage VSS. The variable resistor VR includes fuses F1 to FN and resistors R31 to R3N. The fuses F1 to FN are respectively coupled in series with the resistors R31 to R3N to form a plurality of fuse-resistor strings. For example, the fuse F1 and the resistor R31 form one fuse-resistor string, the fuse F2 and the resistor R32 form another fuse-resistor string, and the rest of the fuse-resistor strings may be inferred by analogy. Each fuse-resistor string is coupled between the sensing end DE and the first resistor R1, and the plurality of fuse-resistor strings are coupled in parallel with each other.

In this embodiment, the resistors R31 to R3N and the resistor R1 may all be polysilicon resistors.

In an initial state, none of the fuses F1 to FN is blown. In the calibration mode, the control circuitry may generate adjustment information and determine whether to blow each of the fuses F1 to FN according to the adjustment information. On the other hand, the resistances of the resistors R31 to R3N may be different. For example, the resistances of the resistors R31 to R3N may form a geometric progression, and the common ratio of this geometric progression may be 2. That is, the resistance of the resistor R31 may be twice the resistance of the resistor R32, the resistance of the resistor R32 may be twice the resistance of the resistor R33, and the rest may be inferred by analogy.

In this embodiment, by blowing each of the fuses F1 to FN, the resistance of the variable resistor VR may be increased, and the monitoring voltage VM may be decreased.

In FIG. 2B, different from the embodiment shown in FIG. 2A, a variable resistor VR in a resistor string 202 further includes a fuse F0 in addition to the fuses F1 to FN and the resistors R31 to R3N. The fuse F0 directly bridges between the sensing end DE and the first resistor R1. When the fuse F0 is not blown, the resistance of the variable resistor VR may approach 0 ohm.

In the embodiment of FIG. 2B, in the calibration mode, when the resistance of the variable resistor VR is to be adjusted, the fuse F0 needs to be blown first. Subsequently, according to whether the sensing temperature information is correct or not, it is determined whether to blow at least one of the fuses F1 to FN.

In FIG. 2C, a resistor string 203 includes a variable resistor VR, a first resistor R1, and a second resistor R2. The variable resistor VR includes a plurality of fuses F1 to FN and a plurality of resistors R31 to R3N. The fuses F1 to FN and the respectively corresponding resistors R31 to R3N form a plurality of fuse-resistor pairs. That is, the fuse F1 and the resistor R31 form a first fuse-resistor pair, the fuse F2 and the resistor R32 form a second fuse-resistor pair, and the rest may be inferred by analogy. The plurality of fuse-resistor pairs are coupled in series with each other between the first resistor R1 and a monitoring end ME. On the other hand, the resistances of the resistors R31 to R3N may be different. For example, the resistances of the resistors R31 to R3N may form a geometric progression, and the common ratio of this geometric progression may be 2. That is, the resistance of the resistor R31 may be twice the resistance of the resistor R32, the resistance of the resistor R32 may be twice the resistance of the resistor R33, and the rest may be inferred by analogy.

In an initial state, none of the fuses F1 to FN is blown, and the resistance of the variable resistor VR is close to 0 ohm at this time.

In the calibration mode, by blowing each of the fuses F1 to FN, the resistance of the variable resistor VR may be increased, and the monitoring voltage VM may be decreased.

In the embodiment of the disclosure, a technician may preset a fuse resistance comparison table in the control circuitry. The fuse resistance comparison table is configured to record the correspondence between whether the fuses F1 to FN are blown or not and the resistance provided by the variable resistor VR. In this manner, the control circuitry may generate sensing temperature information according to the monitoring voltage VM. Further, according to the sensing temperature information and the ambient temperature in the calibration mode, the control circuitry may calculate the resistance to be provided by the variable resistor VR, and then generate adjustment information by looking up the fuse resistance comparison table.

In the above embodiment, the fuses F0 to FN may be fuses of any material, such as metal material, polysilicon material, or memory cells of a phase change memory (PCM). The fuses F0 to FN may also be formed in an anti-fuse configuration and, for example, implemented by a gate oxide structure. The fuse F0 to FN may be blown by laser or current, and there is no particular limitation in this regard.

Figure 3:
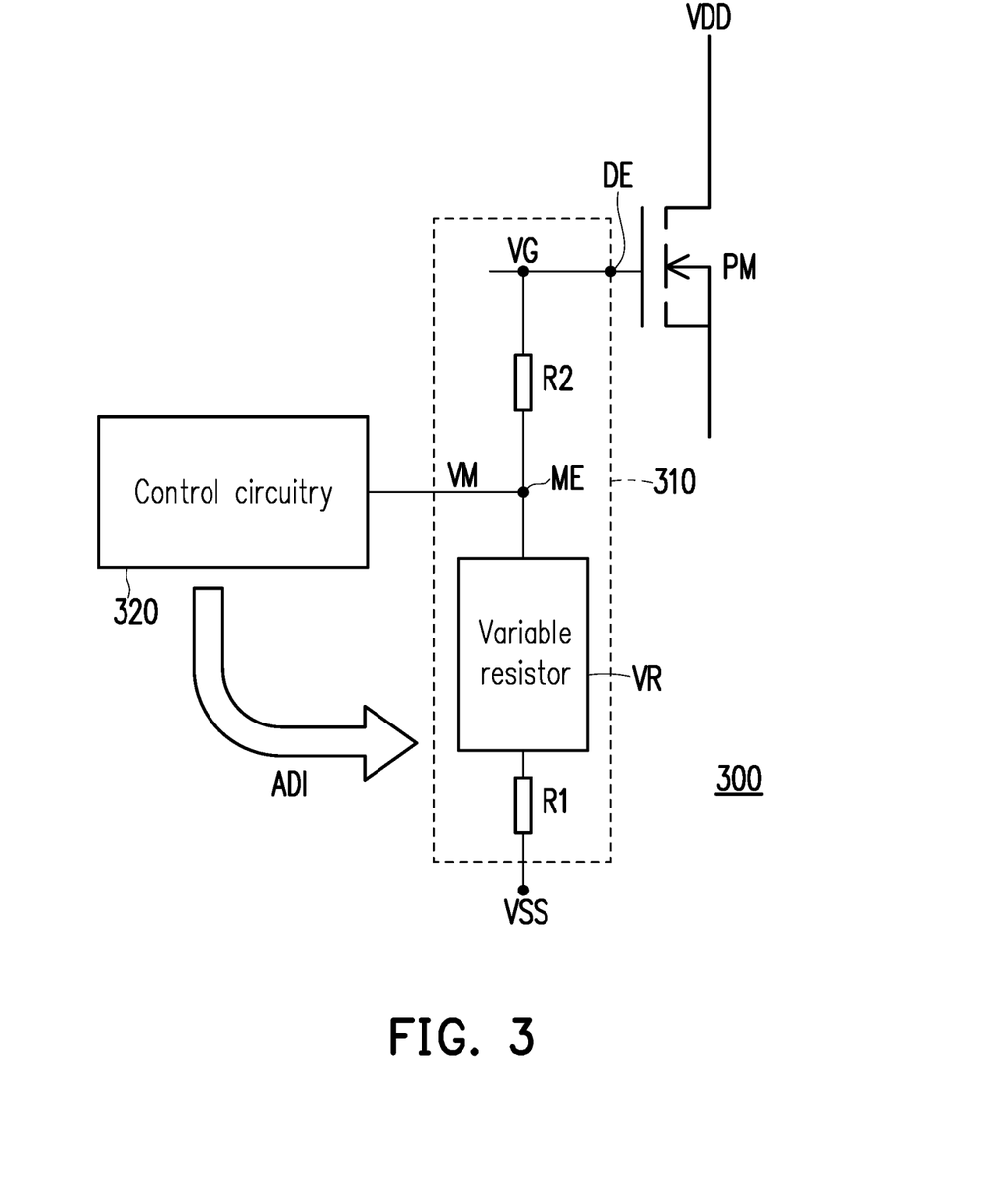
FIG. 3 is a schematic view showing a temperature sensing device according to another embodiment of the disclosure.

Referring to FIG. 3, FIG. 3 is a schematic view showing a temperature sensing device according to another embodiment of the disclosure. A temperature sensing device 300 includes a resistor string 310 and a control circuitry 320. The resistor string 310 includes a variable resistor VR, a first resistor R1, and a second resistor R2 which are coupled in series with each other. Different from the embodiment of FIG. 1, in this embodiment, the variable resistor VR and the first resistor R1 are sequentially coupled between a monitoring end ME and a reference ground voltage VSS, and the second resistor R2 is coupled between a sensing end DE and the monitoring end ME.

In this embodiment, in an initial state, the variable resistor VR may provide a minimum resistance. In the calibration mode, when at least one of the fuses in the variable resistor VR is blown according to adjustment information ADI, the resistance provided by the variable resistor VR may be increased, so that a monitoring voltage VM of the monitoring end ME may be correspondingly increased.

In other embodiments of the disclosure, the positions of the first resistor R1 and the variable resistor VR may be interchanged. That is, in other embodiments of the disclosure, the first resistor R1 may also be coupled between the monitoring end ME and the variable resistor VR.

Figure 4:
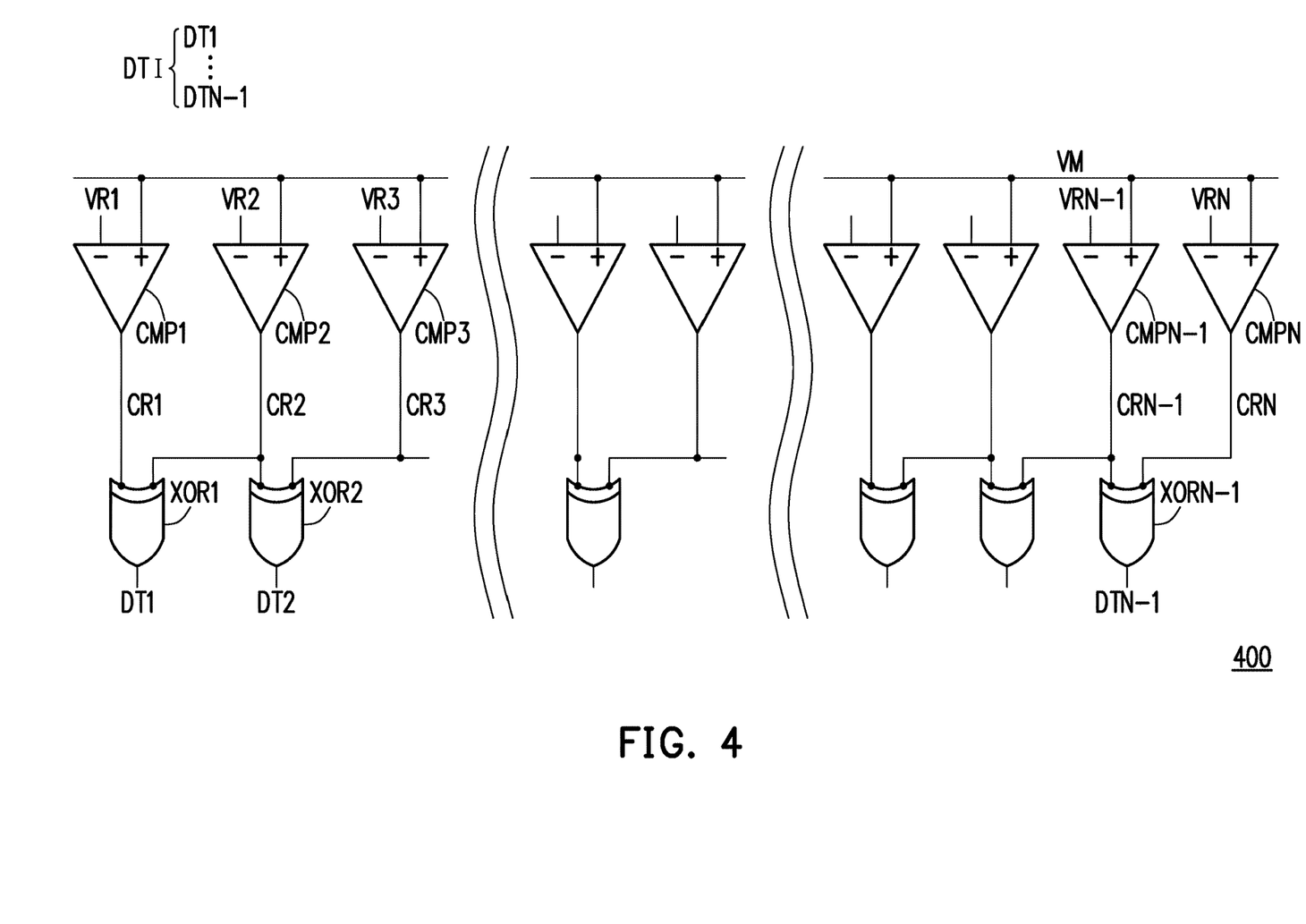
FIG. 4 is a schematic view showing an implementation of a control circuitry in a temperature sensing device according to an embodiment of the disclosure.

Referring to FIG. 4, FIG. 4 is a schematic view showing an implementation of a control circuitry in a temperature sensing device according to an embodiment of the disclosure. A control circuitry 400 includes comparators CMP1 to CMPN and exclusive-OR gates XOR1 to XORN-1. Negative input terminals of the comparators CMP1 to CMPN respectively receive reference voltages VR1 to VRN, positive input terminals of the comparators CMP1 to CMPN commonly receive a monitoring voltage VM, and the comparators CMP1 to CMPN respectively generate comparison results CR1 to CRN. The comparators CMP1 to CMPN compare the monitoring voltage VM with the reference voltages VR1 to VRN to find a voltage interval in which the monitoring voltage VM falls. For example, when the monitoring voltage VM is greater than the reference voltage VR2 and less than the reference voltage VR3, the comparators CMP1 and CMP2 may generate comparison results CR1 and CR2 that are equal to logic 1, and the comparators CMP3 to CMPN may respectively generate comparison results CR3 to CRN that are equal to logic 0.

Each of the exclusive-OR gates XOR1 to XORN-1 receives two of the comparison results CR1 to CRN, and the exclusive-OR gates XOR1 to XORN-1 respectively generate bits DT1 to DTN-1 of sensing temperature information DTI. According to the sequentially arranged reference voltages VR1 to VRN, each of the exclusive-OR gates XOR1 to XORN-1 may receive two adjacent comparison results. For example, the exclusive-OR gate XOR1 may receive the comparison results CR1 and CR2, the exclusive-OR gate XOR2 may receive the comparison results CR2 and CR3, and the rest may be inferred by analogy. Each of the exclusive-OR gates XOR1 to XORN-1 is configured to determine whether the two received comparison results are identical to generate the sensing temperature information DTI. The bit (e.g., equal to logic 1) of the sensing temperature information DTI generated by the exclusive-OR gate that determines that the two received comparison results are different may indicate the interval in which the temperature falls.

In other embodiments of the disclosure, the exclusive-OR gates XOR1 to XORN-1 may be replaced by XNOR gates.

Figure 5A:
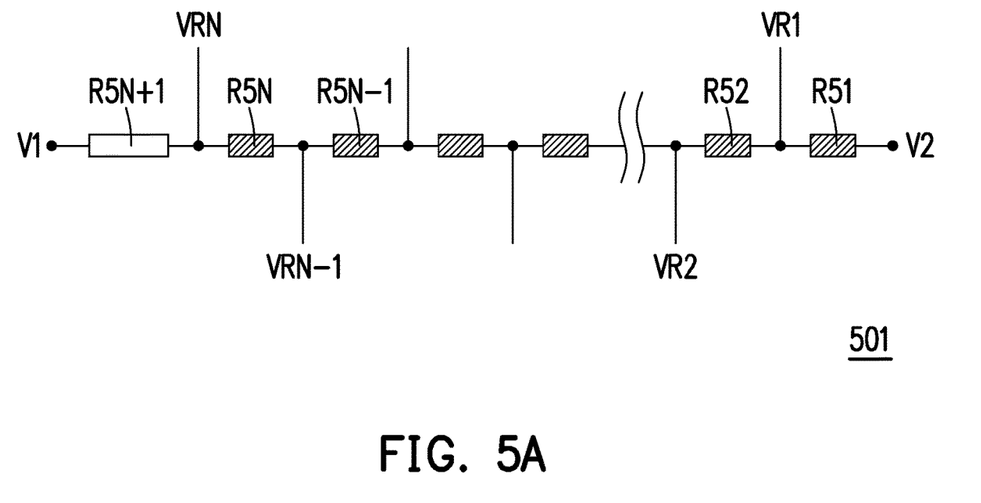
FIG. 5A and FIG. 5B are schematic views showing a generation method of reference voltages of a control circuitry 400 in the embodiment of FIG. 4 of the disclosure.
Figure 5B:
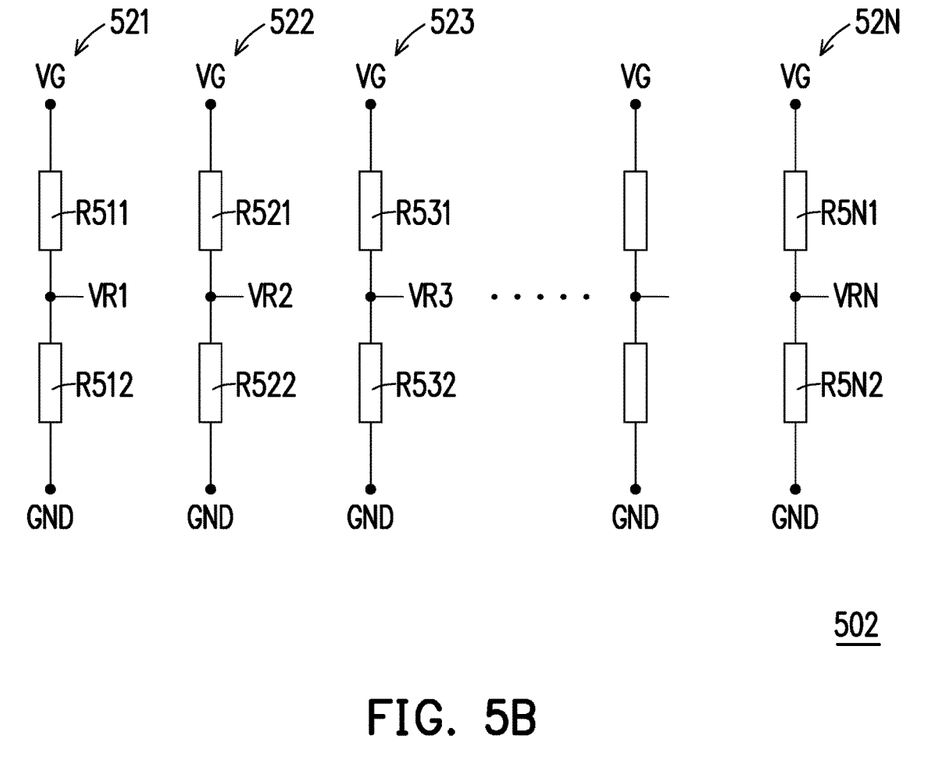

Referring to FIG. 5A and FIG. 5B, FIG. 5A and FIG. 5B are schematic views showing a generation method of reference voltages of the control circuitry 400 in the embodiment of FIG. 4 of the disclosure. In the embodiment of the disclosure, the reference voltages in the control circuitry 400 may be generated by a reference voltage generator. In FIG. 5A, a reference voltage generator 501 includes a plurality of resistors R51 to R5N+1. The resistors R51 to R5N+1 are coupled in series with each other to form a voltage divider circuit. The voltage divider circuit formed by the resistors R51 to R5N+1 has one terminal that receives a voltage V1 and another terminal that receives a voltage V2. Taking the voltage V1 being greater than the voltage V2 as an example, the resistors R51 to R5N+1 may divide a voltage difference between the voltage V1 and the voltage V2 to generate a plurality of reference voltages VR1 to VRN.

In this embodiment, the voltage V1 may be equal to the sensing voltage VG in the embodiment of FIG. 1. The voltage V2 may be a reference ground voltage (e.g., 0 volts).

To prevent the reference voltages VR1 to VRN from being changed due to temperature changes, the resistors R51 to R5N+1 may be formed of polysilicon resistors which are less sensitive to temperature changes. In this embodiment, the resistances of the resistors R51 to R5N may all be the same, and the resistance of the resistor R5N+1 may be different from the resistance of the resistors R51 to R5N. For example, the resistance of the resistor R5N+1 may be greater than the resistance of the resistor R51.

In FIG. 5B, a reference voltage generator 502 includes a plurality of voltage divider circuits 521 to 52N. Each of the voltage divider circuits 521 to 52N is coupled between a sensing voltage VG and a reference ground voltage GND. The voltage divider circuit 521 includes resistors R511 and R512 coupled in series with each other; the voltage divider circuit 522 includes resistors R521 and R522 coupled in series with each other; the voltage divider circuit 523 includes resistors R531 and R532 coupled in series with each other; . . . ; the voltage divider circuit 52N includes resistors R5N1 and R5N2 coupled in series with each other. The voltage divider circuits 521 to 52N respectively generate reference voltages VR1 to VRN by dividing the sensing voltage VG. To prevent the reference voltages VR1 to VRN from being changed due to temperature changes, the resistors R511 to R5N2 may be formed of polysilicon resistors which are less sensitive to temperature changes.

Herein, the quantity of the reference voltages VR1 to VRN may be set according to the resolution of the sensing temperature information in the temperature sensing operation. A designer may adjust the quantity of the reference voltages VR1 to VRN according to the required resolution of the sensing temperature information, and there is no particular limitation in this regard.

Figure 6A:
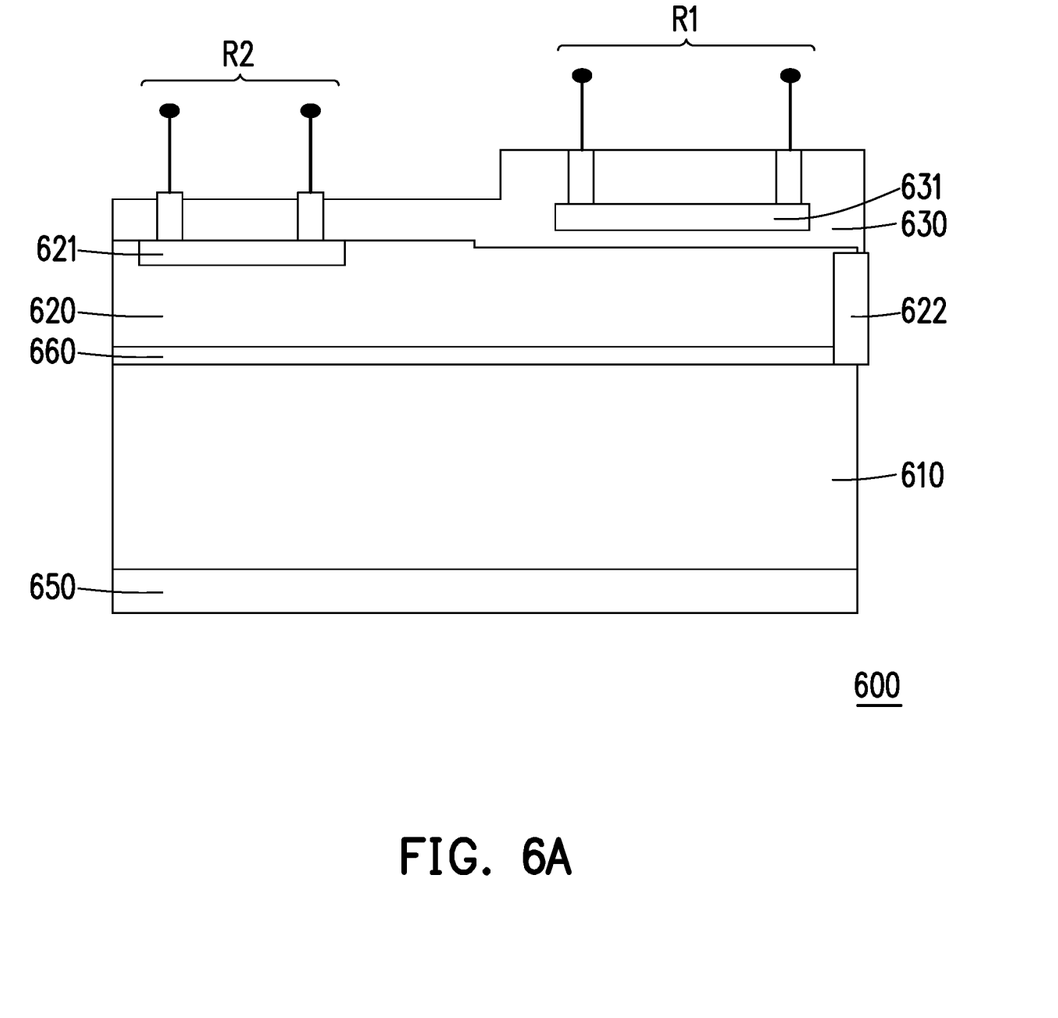
FIG. 6A shows a structure view of a first resistor and a second resistor in a temperature sensing device according to an embodiment of the disclosure.
Figure 6B:
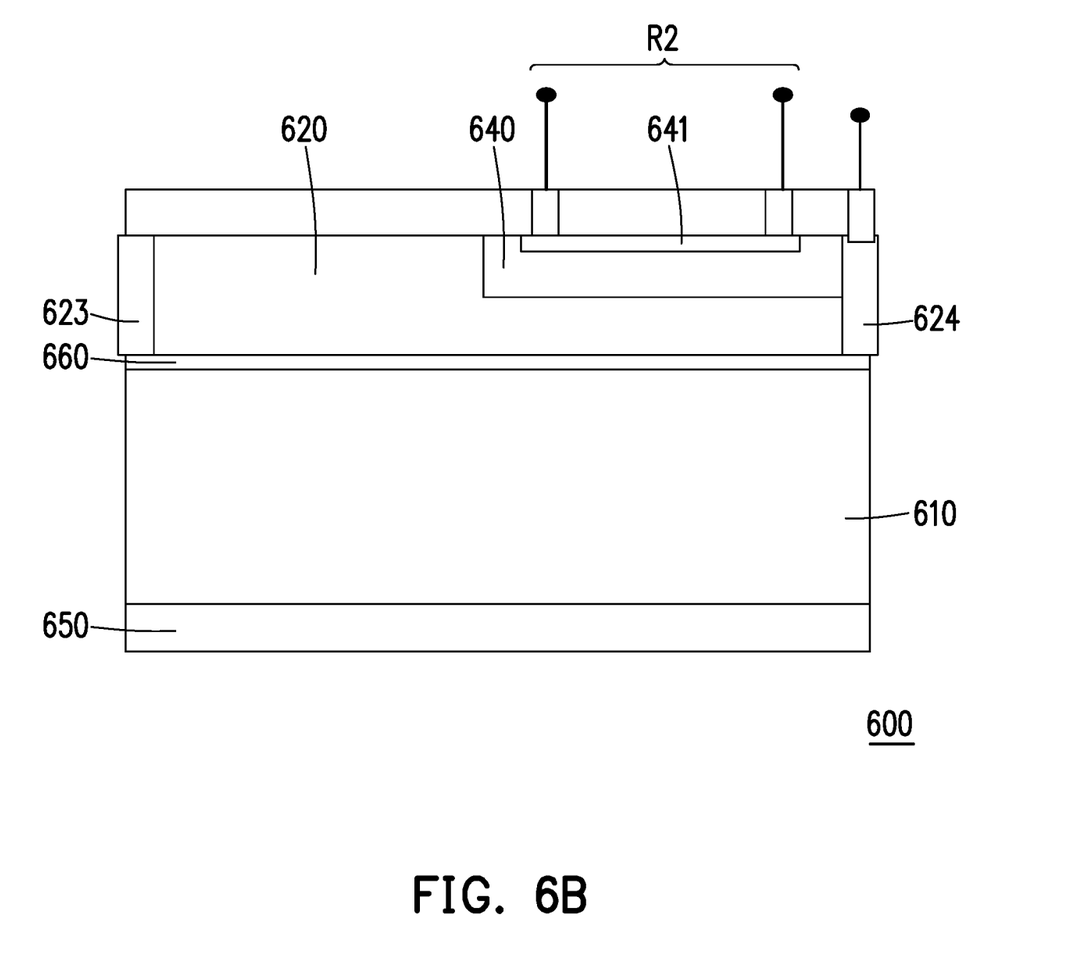
FIG. 6B shows a structure view of another example of the second resistor in the temperature sensing device according to an embodiment of the disclosure.

Referring to FIG. 6A and FIG. 6B, FIG. 6A shows a structure view of a first resistor and a second resistor in a temperature sensing device according to an embodiment of the disclosure, and FIG. 6B shows a structure view of another example of the second resistor in the temperature sensing device according to an embodiment of the disclosure. In FIG. 6A, a first resistor R1 and a second resistor R2 may be provided in a same integrated circuit 600. The integrated circuit 600 includes a drift region 610, a drift region 620, an insulating layer 630, a heavily doped layer 650, and a doped layer 660. The drift region 620 may be formed on the drift region 610 with the doped layer 660 interposed between the drift region 620 and the drift region 610. The conductivity type of the doped layer 660 is opposite to the conductivity types of the drift region 620 and the drift region 610. The insulating layer 630 may cover the drift region 620. The first resistor R1 may be formed of a polysilicon layer 631 and disposed in the insulating layer 630. In addition, the second resistor R2 may be formed of a P-type silicon carbide diffusion layer 621 and disposed in the drift region 620. In addition, the heavily doped layer 650 may be disposed under the drift region 610. The drift region 610 is, for example, an N-type drift region, and the heavily doped layer 650 may be an N+-type heavily doped layer.

On the other hand, the drift region 620 may have a buried well region 622 therein to provide a potential contact.

In addition, the drift region 620 may have buried well regions 623 and 624 therein to provide a plurality of potential contacts.

Similarly, the plurality of resistors in the variable resistor according to the embodiment of the disclosure may also be formed in a manner similar to the first resistor R1.

In FIG. 6B, when the second resistor R2 is an N-type silicon carbide diffusion resistor, the integrated circuit 600 may further have a P-type well region 640. The P-type well region 640 is provided in the drift region 620. The second resistor R2 may be formed of an N-type silicon carbide diffusion layer 641, and the N-type silicon carbide diffusion layer 641 may be formed in the P-type well region 640.

Based on the above description, it is learned that the resistor string in the temperature sensing device of the disclosure may be provided on the same integrated circuit as the power transistor, and can quickly sense changes in the sensing voltage caused due to temperature changes on the control terminal of the power transistor to obtain correct sensing temperature information.

In summary of the above, the temperature sensing device of the disclosure divides the sensing voltage on the sensing end by the resistor string to obtain the monitoring voltage. As the voltage dividing ratio provided by the resistor string is associated with the sensed temperature, the temperature sensing device of the disclosure can generate sensing temperature information according to the monitoring voltage. In addition, the temperature sensing device of the disclosure is provided with a variable resistor in the resistor string. Accordingly, in the calibration mode, by adjusting the resistance provided by the variable resistor, the voltage dividing ratio of the resistor string is adjusted to improve the accuracy of temperature sensing.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A temperature sensing device comprising:
a resistor string comprising a variable resistor, a first resistor, and a second resistor which are coupled in series with each other, wherein the resistor string is coupled between a sensing end and a reference ground voltage, and the first resistor and the second resistor are coupled to a monitoring end to provide a monitoring voltage; and
a control circuitry which is coupled to the resistor string, receives the monitoring voltage, generates sensing temperature information by comparing the monitoring voltage with a plurality of reference voltages, and generates adjustment information according to the sensing temperature information,
wherein the control circuitry adjusts a resistance provided by the variable resistor according to the adjustment information, the first resistor is a polysilicon resistor, and the second resistor is a silicon carbide diffusion resistor,
wherein the variable resistor comprises:
N first fuses, N being a positive integer; and
N third resistors respectively forming a plurality of fuse-resistor strings with the first fuses, wherein the fuse-resistor strings are coupled in parallel with each other,
wherein the control circuitry determines whether to blow at least one of the first fuses according to the adjustment information to adjust the resistance provided by the variable resistor.

2. The temperature sensing device according to claim 1, wherein a plurality of resistances of the N third resistors form a geometric progression with a common ratio equal to 2.

3. The temperature sensing device according to claim 1, wherein the variable resistor further comprises:
a second fuse coupled in parallel with the fuse-resistor strings.

4. A temperature sensing device comprising:
a resistor string comprising a variable resistor, a first resistor, and a second resistor which are coupled in series with each other, wherein the resistor string is coupled between a sensing end and a reference ground voltage, and the first resistor and the second resistor are coupled to a monitoring end to provide a monitoring voltage; and a control circuitry which is coupled to the resistor string, receives the monitoring voltage, generates sensing temperature information by comparing the monitoring voltage with a plurality of reference voltages, and generates adjustment information according to the sensing temperature information, wherein the control circuitry adjusts a resistance provided by the variable resistor according to the adjustment information, the first resistor is a polysilicon resistor, and the second resistor is a silicon carbide diffusion resistor, wherein the variable resistor comprises:

N third resistors, N being a positive integer; and

N first fuses respectively coupled in parallel with the N third resistors to form a plurality of fuse-resistor pairs, wherein the fuse-resistor pairs are coupled in series with each other, wherein the control circuitry determines whether to blow at least one of the first fuses according to the adjustment information to adjust the resistance provided by the variable resistor.

5. The temperature sensing device according to claim 4, wherein a plurality of resistances of the N third resistors form a geometric progression with a common ratio equal to 2.

6. The temperature sensing device according to claim 4, wherein the control circuitry comprises a fuse resistance comparison table, and the control circuitry looks up the fuse resistance comparison table according to the monitoring voltage to adjust the resistance of the variable resistor.

7. A temperature sensing device comprising:

a resistor string comprising a variable resistor, a first resistor, and a second resistor which are coupled in series with each other, wherein the resistor string is coupled between a sensing end and a reference ground voltage, and the first resistor and the second resistor are coupled to a monitoring end to provide a monitoring voltage; and a control circuitry which is coupled to the resistor string, receives the monitoring voltage, generates sensing temperature information by comparing the monitoring voltage with a plurality of reference voltages, and generates adjustment information according to the sensing temperature information, wherein the control circuitry adjusts a resistance provided by the variable resistor according to the adjustment information, the first resistor is a polysilicon resistor, and the second resistor is a silicon carbide diffusion resistor, wherein the control circuitry comprises:

a plurality of comparators which respectively receive the reference voltages and commonly receive the monitoring voltage, wherein each of the comparators compares the monitoring voltage with the corresponding reference voltage to generate a comparison result; and a plurality of logic operators, wherein each of the logic operators performs a logic operation on two of the comparison results, and the logic operators respectively generate a plurality of bits of the sensing temperature information.

8. The temperature sensing device according to claim 7, wherein each of the logic operators is an exclusive-OR gate or an XNOR gate.

9. The temperature sensing device according to claim 7, wherein the reference voltages comprise a first reference voltage to an M-th reference voltage arranged in order of magnitude, the comparators comprise a first comparator to an M-th comparator respectively corresponding to the first reference voltage to the M-th reference voltage, and the comparators respectively generate a first comparison result to an M-th comparison result, wherein each of the logic operators receives an i-th comparison result and an (i+1)-th comparison result and generates an i-th bit of the sensing temperature information, wherein M is a positive integer greater than 1, and i is a positive integer greater than 0 and less than M.

10. The temperature sensing device according to claim 7, wherein the control circuitry further comprises:

a reference voltage generator which generates the reference voltages.

11. The temperature sensing device according to claim 10, wherein the reference voltage generator comprises:

a voltage divider circuit having a first terminal that receives a second voltage and a second terminal that receives a third voltage, wherein the voltage divider circuit generates the reference voltages by dividing a difference between the second voltage and the third voltage, and the voltage divider circuit comprises:

a plurality of third resistors sequentially coupled in series between the second voltage and the third voltage, wherein the third resistors generate the reference voltages by dividing the difference between the second voltage and the third voltage, and the third resistors are polysilicon resistors.

12. The temperature sensing device according to claim 10, wherein the reference voltage generator comprises:

a plurality of voltage divider circuits which respectively generate the reference voltages, each of the voltage divider circuits comprising:

a third resistor and a fourth resistor which are coupled in series with each other between a second voltage and a third voltage to divide a voltage difference between the second voltage and the third voltage to generate the corresponding reference voltages, wherein the third resistor and the fourth resistor are polysilicon resistors.

13. The temperature sensing device according to claim 1, wherein the first resistor and the second resistor are sequentially coupled between the sensing end and the reference ground voltage.

14. The temperature sensing device according to claim 1, wherein the second resistor and the first resistor are sequentially coupled between the sensing end and the reference ground voltage.

15. The temperature sensing device according to claim 1, wherein the second resistor is an N-type silicon carbide diffusion resistor or a P-type silicon carbide diffusion resistor.

16. The temperature sensing device according to claim 1, wherein the control circuitry adjusts the resistance provided by the variable resistor so that the monitoring voltage is equal to a predetermined voltage value.

17. The temperature sensing device according to claim 1, wherein the sensing end is a control terminal of a power transistor, and the power transistor is integrally provided in a same integrated circuit with the first resistor, the second resistor, and the variable resistor.

18. The temperature sensing device according to claim 17, wherein the second resistor is a P-type silicon carbide diffusion resistor and comprises:

a P-type diffusion region provided in a drift region of the integrated circuit.

19. The temperature sensing device according to claim 17, wherein the second resistor is an N-type silicon carbide diffusion resistor and comprises:
    an N-type diffusion region provided in a well region, the well region being provided in a drift region of the integrated circuit.

\* \* \* \* \*